H. VON DER OELSNITZ.
GAS AEROPLANE MOTOR AIRSHIP.
APPLICATION FILED MAY 5, 1910.

999,068.

Patented July 25, 1911.
9 SHEETS—SHEET 2.

H. VON DER OELSNITZ.
GAS AEROPLANE MOTOR AIRSHIP.
APPLICATION FILED MAY 5, 1910.

999,068.

Patented July 25, 1911.
9 SHEETS—SHEET 7.

H. VON DER OELSNITZ.
GAS AEROPLANE MOTOR AIRSHIP.
APPLICATION FILED MAY 5, 1910.

999,068.

Patented July 25, 1911.
9 SHEETS—SHEET 9.

Witnesses
Samuel Payne.
K. H. Butler

Inventor
H. von der Oelsnitz.
by
Attorneys

UNITED STATES PATENT OFFICE.

HANS VON DER OELSNITZ, OF PITTSBURG, PENNSYLVANIA.

GAS-AEROPLANE MOTOR-AIRSHIP.

999,062.    Specification of Letters Patent.    Patented July 25, 1911.

Application filed May 5, 1910. Serial No. 559,458.

*To all whom it may concern:*

Be it known that I, HANS VON DER OELSNITZ, a citizen of the United States of America, residing at Pittsburg, in the county of Allegheny and State of Pennsylvania, have invented certain new and useful Improvements in Gas-Aeroplane Motor-Airships, of which the following is a specification, reference being had therein to the accompanying drawing.

This invention relates to airships and dirigible balloons, and the primary object of my invention is to provide an airship with planes that will facilitate the guiding of the airship and increase the equilibrium and stability of the same.

Another object of the invention is to provide an airship with novel ballast tanks that can be easily controlled to increase or decrease the amount of ballast and thereby govern the ascent and descent of the airship.

A further object of the invention is to provide an airship of the above type with a novel frame that will add rigidity to the entire structure, and to so design the frame as to support a plurality of ballonnets.

I attain the above objects by an airship or balloon embodying various instrumentalities which coöperate to provide a safe and durable flying machine that can be used for various purposes, and before describing the construction and operation of these instrumentalities, it is proper to describe the general organization to which, in the construction of my machine, I prefer to resort.

Primarily there is a strong and rigid frame adapted to provide compartments for ballonnets, these ballonnets being independent of one another but coöperating to provide sufficient buoyancy for the flying machine. The frame of the machine is adapted to support passenger and engine compartments, and the frames forming these compartments are provided with landing and cushioning shoes adapted to insure a landing of the machine without injury to the same. While one of the compartments is designed for passengers, other of the compartments are adapted to contain the power by which the flying machine is driven and the operators or crew employed for controlling the machine when in flight.

Associated with the foregoing instrumentalities, there are planes located in such a manner as to facilitate the ascent or descent of the machine and arranged whereby they can be easily controlled. Besides these planes there are ballast tanks, balancing devices, propellers, and a structure adapted to be used in connection with the flying machine for supporting explosives for war purposes, the discharge of the explosives being such as not to unbalance the machine.

Reference will now be had to the drawings, wherein:
Fig. 16
is a side elevation of the same.

In order that the construction of the flying machine can be fully understood, the structure and the mechanisms will be considered under separate captions and then the general operation of the mechanisms described. The captions are namely, a frame; ballonnets; ballast tanks; passenger and engine carriages or compartments; balancing devices; landing and cushioning shoes; planes; propellers and driving mechanism thereof, and an airship designed for war purposes. Each one of these captions will be considered in detail, and it is thought that then it will be apparent that I have devised an airship or flying machine that can be used for pleasure, business or war purposes, the entire structure being designed so as to render my machine safe in all kinds of weather, without resorting to devices that will impair the buoyancy and flying qualifications of the machine.

Figures 6, 7, 8, 9:
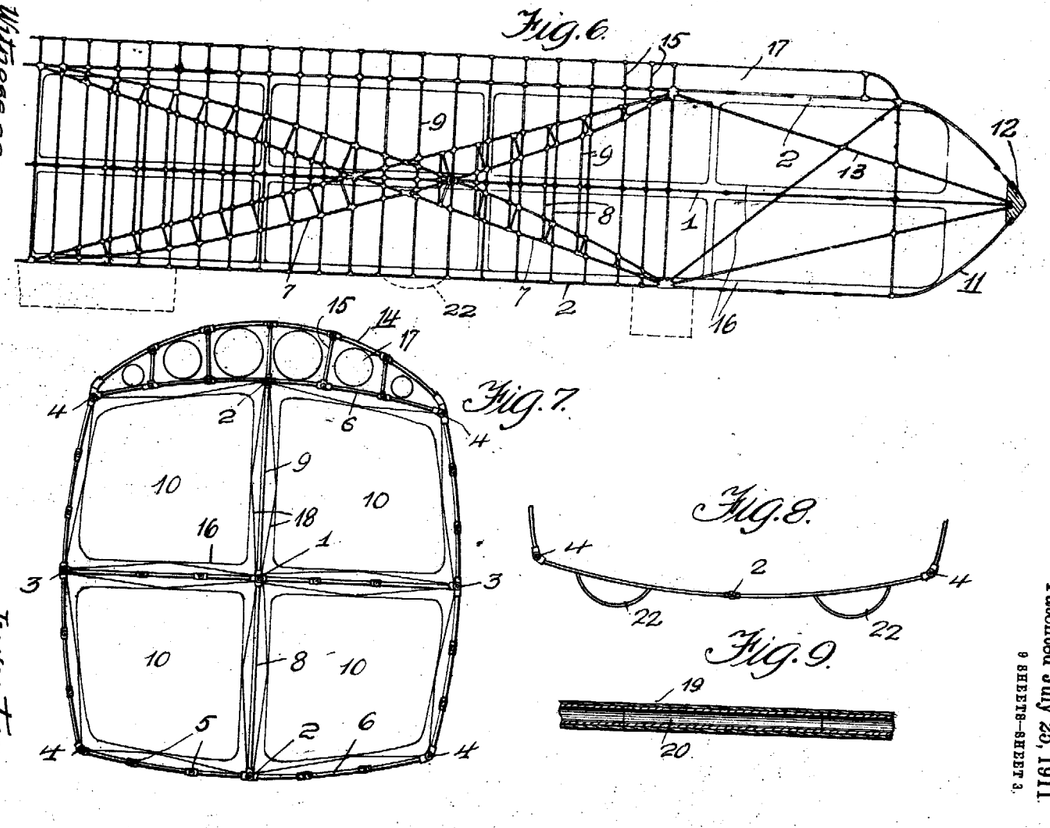
Fig. 6 is an enlarged elevation of a portion of the frame of the airship.
Fig. 7 is an enlarged cross sectional view of the same.
Fig. 8 is an end view of the ballast tanks adapted to be carried by the frame.
Fig. 9 is an enlarged longitudinal sectional view of the tubing adapted to form the frame.
Figure 10:
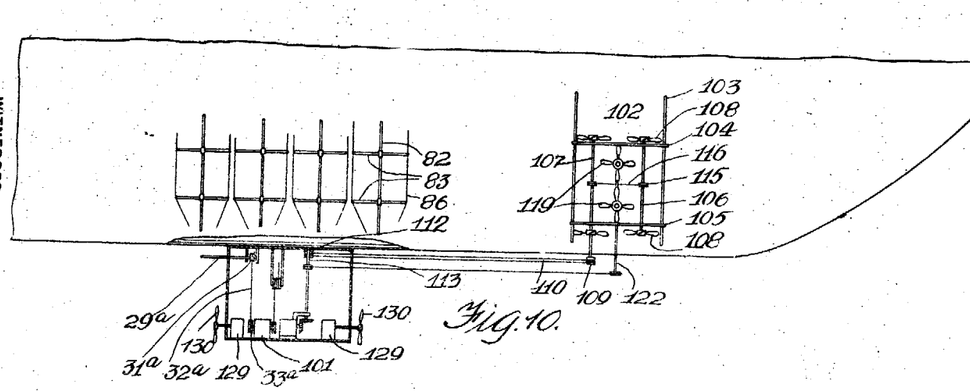
Fig. 10 is an enlarged side elevation of a portion of the airship showing one of the operating compartments of the airship.
Figure 11:
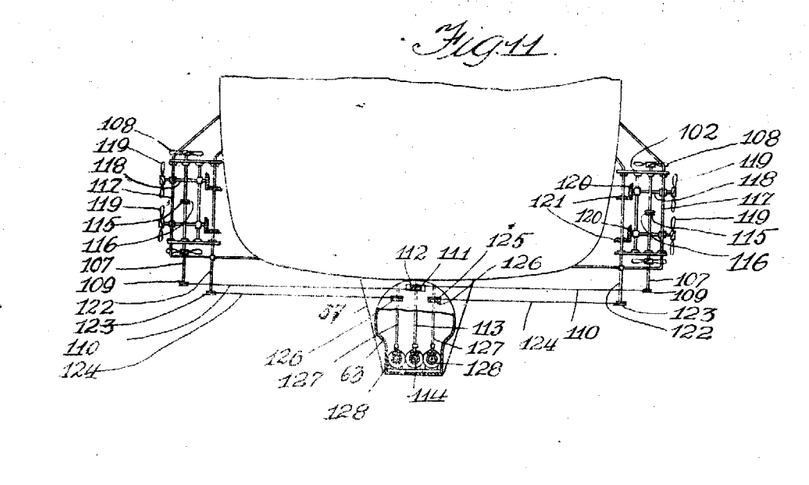
Fig. 11 is an end view of the same.

*The frame.*—The frame comprises longitudinal main rods 1, 2, and 3, these rods in conjunction with rods 4 and 5 being arranged to form substantially a rectangular structure, said rods being joined by connecting rods 6 adapted to form the walls or shell of the airship. The rods 6 are arranged between the rods 2, 3, 4, and 5 and it is to these rods that an exterior covering (not shown) can be secured. The rods 2 are adapted to be connected to the rod 1 by diagonally disposed intersecting trusses 7, these trusses for the greater part of their length being connected to the rod 1 by vertical rods 8 and in addition to these trusses additional vertical rods 9 are used. The rods 3 are connected to the rod 1 by similar trusses and rods, thereby dividing the frame into four longitudinal compartments 10, and these compartments are sub-divided from one end of the airship to the opposite end thereof. At the ends of the frame the rods 1 to 4 inclusive are carried beyond the rods 5 to form a nose 11 at each end of the frame, the nose being shaped by converging the ends of the rods 1 to 4 inclusive and connecting the ends by a nose-piece 12. Tie-rods 13 are used to stiffen the ends of the frame and it is in the nose at each end of the frame that additional compartments are provided. The top of the frame is rounded off by a roof structure 14 extending from one end of the machine to the opposite end thereof, the roof structure being made of transverse curved rods 14 and longitudinal rods suitably connected together to provide longitudinal compartments 15. The frame in its entirety is made of light and durable metal, for instance aluminum and it is preferable to make all the rods tubular and of double thickness. I accomplish this by making the rods in sections 19 and 20, with the sections 19 of a greater diameter than the sections 20, whereby the small sections 20 can be fitted in the large sections 19 and the joints or confronting ends of the sections 19 staggered with relation to the joints or confronting ends of the sections 20. With the sections 19 and 20 of considerable length I attain a rod that is very rigid and easy to repair should any part of the rod be bent. In connecting the various rods it is preferable to use elbows, tees, and specially designed fittings, similar to those used in connecting gas pipes, some of the fittings being irregular in shape on account of the number of rod connections, and in order that all the rods can be assembled it is preferable to provide some of the fittings with right-hand screw threads and others with left-hand screw threads for the ends of connecting rods.

*Ballonnets.*—In the compartments 10 of the frame and the compartments 15 of the roof structure are arranged ballonnets 16 and 17 secured in position by cables 18 or other fastening means. The ballonnets 16 are about the same size throughout, but the sizes of the ballonnets 17 vary on account of the shape of the roof structure, the large ballonnets being arranged centrally of the structure and their size gradually decreasing to the edges of the structure. The ballonnets are made of a fine grade of silk, as Japanese silk, and are suitably inflated with hydrogen or other gas that is lighter than air. After the ballonnets are inflated within the frame they can be varnished and made water-proof and air-tight. By using a plurality of these ballonnets, I am enabled to retain the airship in the air even though one or more of the ballonnets should be punctured or accidentally burst, and it is through this principle of distributing the sustaining power of the machine that I am enabled to retain the machine in the air under the most trying circumstances. In using the cylindrical ballonnets and arranging them in tiers, end to end, I am enabled to use tie rods, braces and frames in adding rigidity to the entire frame, it being possible to arrange the braces in between the tiers and units of the tiers, and it is practically impossible to obtain such bracing by using spherical ballonnets.

*Ballast tanks.*—The frame of the airship is provided with two ballast tanks, these tanks being supported in depending oblong frames 21 carried by the rods 2 and 5 at points approximately equi-distant from the ends of the frame and the central portion thereof, the frames being constructed of rods similar to those previously described. In the frames 21 are arranged water tanks 22 made of metal or a similar material, the top of each tank being flat to rest against the rods 2 and 5, while the bottom of each tank is rounded to avoid any resistance when the flying machine is inflated. Extending into each tank is a revoluble shaft 23 and mounted upon said shaft within the tank are spiral agitators 24, these agitators preventing the water within the tanks from freezing. Upon each shaft between the confronting ends of the spiral agitators is a beveled gear wheel 25 and adapted to mesh with said beveled gear wheel is another gear wheel 26 carried by the upper end of a vertical shaft 27 journaled in a discharge spout 28 secured centrally of the bottom of the tank 22. The spout comprises two tubular sections 29 and 30 connected by a coupling piece or bearing 31, said coupling piece serving as a central bearing for the shaft 27, while the lower end of the shaft is revolubly supported in a bearing 32 arranged in the lower end of the tubular section 30. Upon the shaft 27 within the tubular sections 29 and 30 are spiral retarding members 33, these members preventing a rapid exhaust of water when the lower end of the outlet structure is opened. Connected to the lower end of the tubular section 30 is a valve seat 34 provided with rearwardly extending brackets 35. Connected to the coupling piece 31 are brackets 36 and 37 and pivotally connected to the bracket 36 by a pin 38 is the angularly disposed arm 39 of a valvular member 40. This member is provided with a resilient valve 41 adapted to engage the seat 34 and close the lower end of the spout. The member 40 is provided with depending brackets 42 adapted to be connected to the brackets 35 by retractile springs 43 adapted to normally retain the valve in a closed position. In addition to these springs the brackets 37 are provided with coiled springs 44 connected to the arm 39, as at 45, below the brackets 36. The upper end of the arm 39 is connected by a cable 46 to a link 47 adapted to surround the spout 28, said link being connected to another cable 48 adapted to extend to one of the operating compartments or carriages of the airship. The agitator 24 and the retarder 38 are adapted to be continuously driven when freezing weather is encountered or whenever the valve 41 is opened by pulling upon the cable 48 to allow ballast to escape. The outer ends of the shafts 23 are provided with beveled gear wheels 23$^a$ meshing with beveled gear wheels 24$^a$ mounted upon a shaft 25$^a$ arranged transversely of the airship in depending bearings 26$^a$, carried by the main frame of the airship. The shaft 25$^a$ is provided with a beveled gear wheel 27$^a$ meshing with a beveled gear wheel 28$^a$ mounted upon a longitudinal shaft 29$^a$, journaled in depending bearings 30$^a$, carried by the main frame work of the airship. The shaft 29$^a$ extends into the operating compartment and is provided with a belt wheel 31$^a$ over which travels a belt 32$^a$ adapted to travel over a belt wheel 33$^a$ mounted upon the end of the armature shaft of the motor 101.

Figure 15:
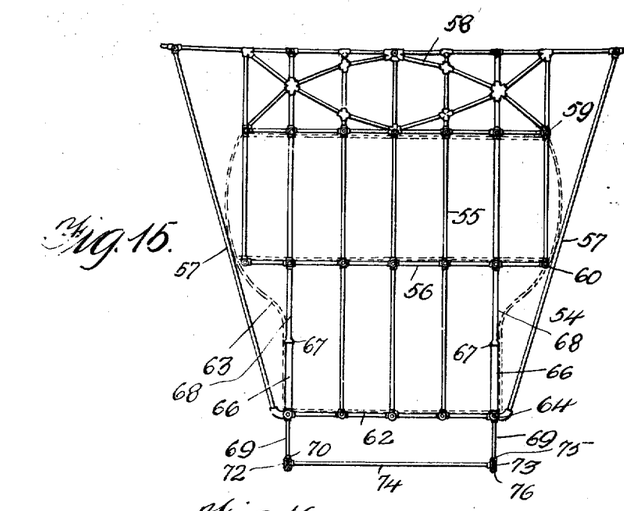
Fig. 15 is an enlarged end view of the frame work of a passenger or operating compartment.
Figure 16:
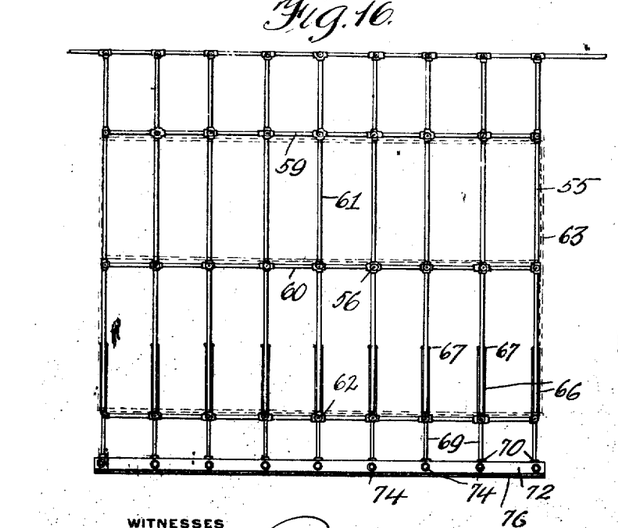

*Passenger and engine compartments or carriages.*—For the location and construction of these compartments or carriages, reference will be had to Figs. 1, 2, 10 and 11. The engine compartments or carriages are at each end of the frame, while the passenger or freight compartment is located centrally of the airship. All of these compartments are suitably suspended from the main frame by frames that inclose the structures forming the compartments. The suspension frames of the engine compartments are identical with the frame of the passenger or freight compartment, with the exception that the latter is made of a greater length than the former, in order to support a structure in which a large number of passengers or a great amount of freight can be placed. As the suspension frames are identical, I deem it only necessary to describe one of said frames and reference will now be had to Figs. 15 and 16. The rods 5, 6 and 2 of the main frame are provided with depending end frames 54, each end frame consisting of vertical rods 55, transverse rods 56 and angularly disposed rods 57, these rods being fitted together similar to the rods of the main frame. The upper part of each of the end frames 54 is reinforced by angularly disposed tie rods 58. The end frames 54 are adapted to be connected by longitudinal rods 59 and 60, and these rods intermediate the end frames 54 are connected by vertical rods 61, these rods providing walls and in conjunction with these walls is a floor formed by transverse rods 62. This floor is adapted to support the bottom of a carriage 63 placed within the frame. In order that easy access can be had to the carriage, some of the rods 60 and 61 can be removed upon one side thereof.

*Balancing devices.*—In addition to the liquid ballast I use a shiftable ballast of balancing devices that are normally carried by the airship. The balancing devices are used for maintaining an even keel or in case of emergency, and comprise longitudinally arranged weights 49 and transversely arranged weights 50 and 50ª. The longitudinally arranged weights 49 are located between the passenger compartment and the engine compartments and are adapted to be operated from the engine compartments. The weights 49 are attached to cables 51 passing over sheaves 51ª carried by the passenger compartment, said cables extending into the engine compartments whereby they can be easily shifted by the operators of the airship. The transverse weights 50 and 50ª are arranged at the ends of the airship and are supported upon cables 52 passing over sheaves 53 carried by depending bearings 53ª of the main frame work of the airship. The cables 52 extend through openings 53ᵇ provided therefor in the engine or operating compartment, and these cables as well as the cables 51 are adapted to be manipulated to shift the weights 49, 50, and 50ª to properly balance the airship.

Figure 17:
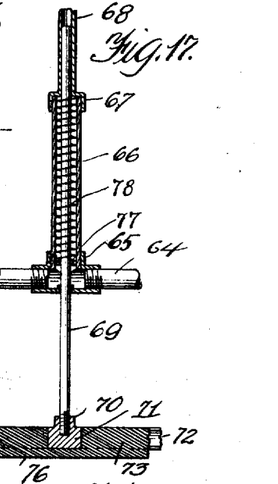
Fig. 17 is a vertical sectional view of a portion of one of the landing or cushioning devices.
Figures 18, 19:
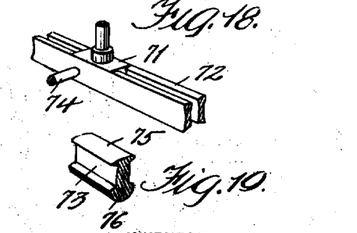
Fig. 18 is a perspective view of a portion of one of the shoe holders.
Fig. 19 is a perspective view of a portion of one of the shoes.
Figures 20, 21, 22, 23, 24, 25:
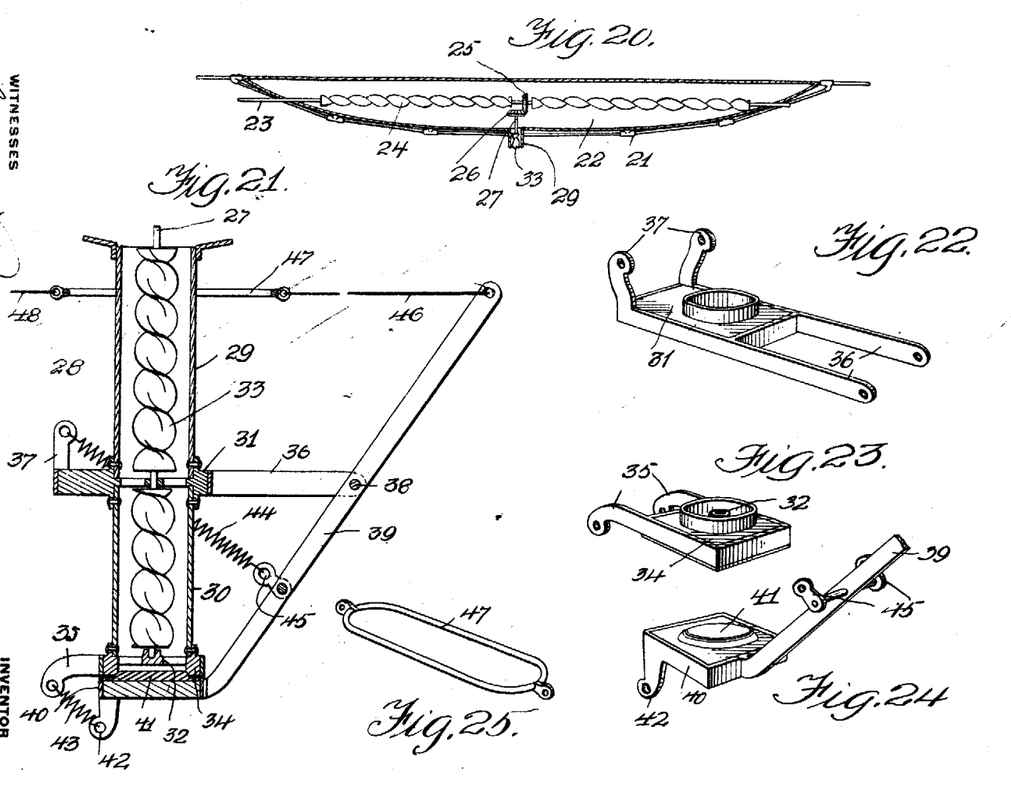
Fig. 20 is an enlarged longitudinal sectional view of one of the ballast tanks.
Fig. 21 is an enlarged vertical sectional view of a discharge spout forming part of one of the tanks.
Fig. 22 is a perspective view of a coupling and bearing piece forming part of the discharge spout.
Fig. 23 is a perspective view of a valve seat forming part of the discharge spout.
Fig. 24 is a perspective view of a detached valve for the discharge spout.
Fig. 25 is a perspective view of a link forming part of the actuating mechanism of the discharge spout valve.
Figures 26, 27, 28, 29, 30, 31:
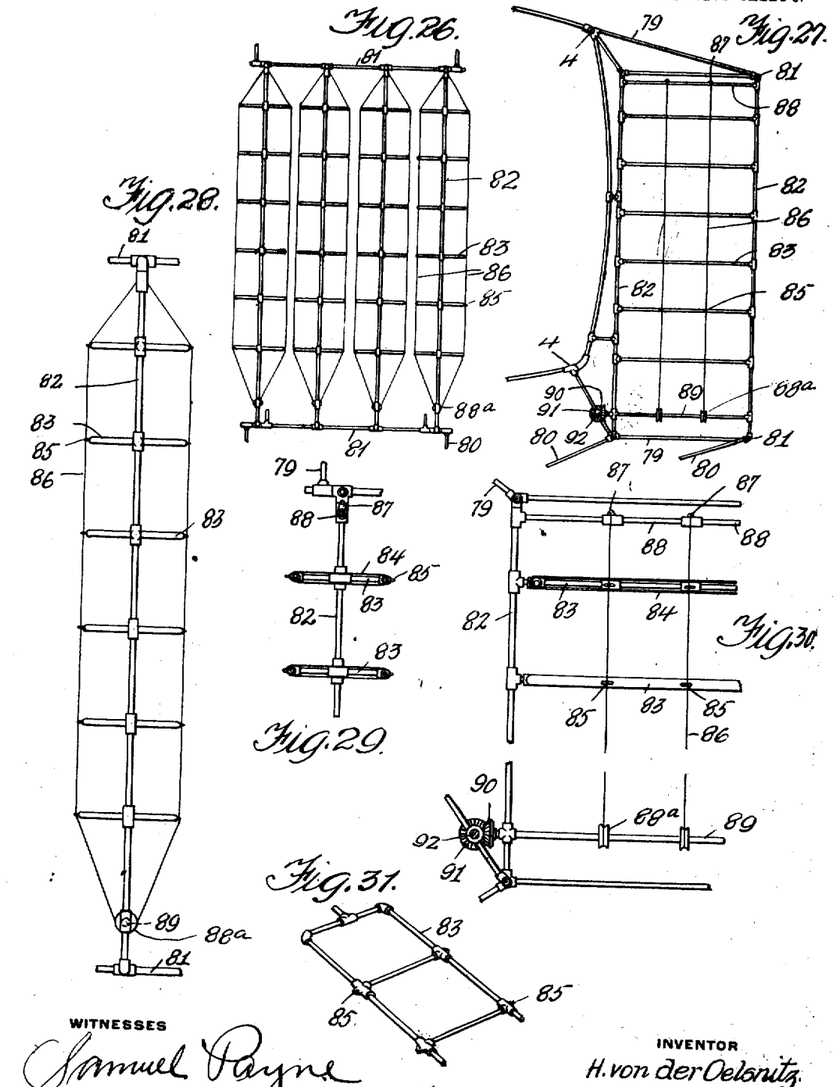
Fig. 26 is an enlarged elevation of a detached plane structure.
Fig. 27 is a front elevation of the same.
Fig. 28 is an enlarged elevation of one of the plane units.
Fig. 29 is a vertical sectional view of a portion of the same.
Fig. 30 is an enlarged elevation of one of the plane units, partly broken away and partly in section.
Fig. 31 is a perspective view of a portion of one of the frames of the units.
Figure 32:
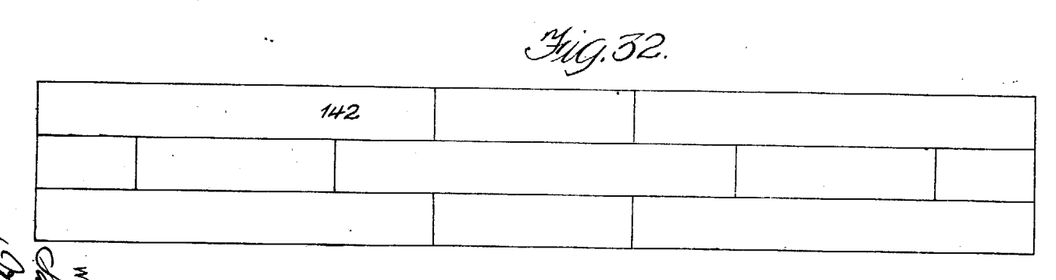
Fig. 32 is a diagrammatic plan of the arrangement of the explosive chambers used in connection with the airship designed for war purposes.
Figure 33:
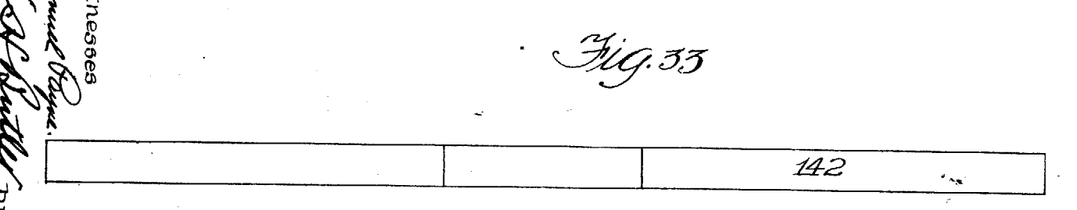
Fig. 33 is a side elevation of the same.

*Landing and cushioning shoes.*—The longitudinal rods 64 forming the side rails of the floor of each carriage frame 54 are provided with tees 65 and mounted in these tees are vertical cylinders 66 having the upper ends thereof provided with caps 67 supporting tubular guides 68. Slidably mounted in the guides 68 and extending downwardly through the cylinders 66 and the bottom of the tees 65 are shoe rods 69, and the lower ends of these rods are connected, as at 70 to longitudinal shoe holders 71. The shoe holders 71 have the sides thereof connected by longitudinal parallel bars 72, and these bars are adapted to hold resilient shoes 73, preferably made of rubber. The bars 72 can be suitably connected, and the bars upon one side of the frame are connected to the bars upon the other side by connecting rods 74. The shoes 73 having the upper edges thereof formed with lateral flanges 75 adapted to extend over the upper edges of the bars 72, between the holders 71, while the lower edges of the shoes are provided with treads 76. The rods 69 within the rods 66 are provided with heads 77, and encircling the rods 69 between said heads and the caps 67 are coil springs 78, these springs being compressed when the airship is supported by the landing or cushioning shoes.

*Planes.*—The sides of the airship are provided with groups of planes, one group of planes being arranged adjacent to the ends of the airship with the other groups intermediate the ends, each group comprising a plurality of units adapted to be adjusted from the engine carriages of the airship, the planes not only add stability to the airship when in action, but in some instances act as retarders or steering devices adapted to insure perfect control of the airship when soaring or traveling against air currents. The longitudinal rods 4 of the main frame are provided with outwardly extending brackets 79 arranged one above the other, with the lower brackets connected to the frames 54 of the carriages by angularly disposed rods 80. Four brackets are used in connection with each group of planes and the upper and lower brackets are connected by longitudinal rods 81, and connecting said rods are vertical bearing rods 82. Trunnioned between said rods are a plurality of plane frames 83 and these frames are covered with silk, canvas, or other material 84. The frames 83 have the longitudinal sides thereof provided with lugs 85 having connected thereto endless cables 86, said cables passing upwardly through eyelets 87 provided therefor upon a rod 88 connecting the vertical rods 82. The cables 86 pass over sheaves 88ª mounted upon shafts 89 journaled in the bearing rods 82 at the lower end of each plane unit. The inner ends of the shafts 89 are provided with beveled gear wheels 90 meshing with beveled gear wheels 91 mounted upon longitudinal shafts 92, journaled in bearings 93 projected from the lower longitudinal rods 4 of the main airship frame. Upon the shafts 92 are mounted belt wheels 94 over which pass endless belts 95 that extend through openings 96 in the side walls of the engine or operating compartments, the belts 95 extend over sheaves 96ª journaled in a hanger 97 suspended from the ceilings of the engine or operating compartments, these hangers being provided with an additional sheave 98 for a belt 99 adapted to extend over a sheave 100, carried by the armature shaft of a motor 101 located in the engine or operating compartment at the ends of the airship. The planes located intermediate the ends of the airship can be controlled from the operating compartments at the end of the airship or a motor can be located in the passenger compartment for controlling the intermediate planes similar to the end planes.

Figure 1:
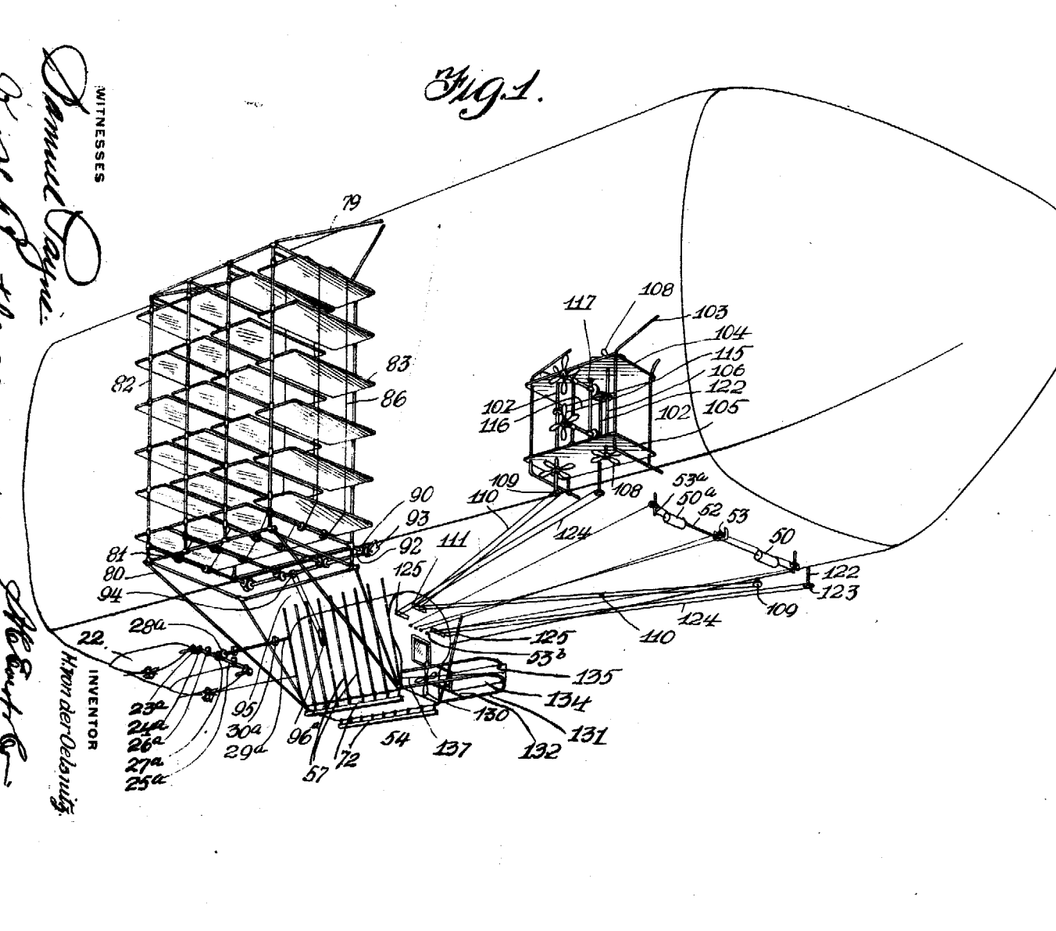
Figure 1 is a perspective view of one end of the airship.
Figure 2:
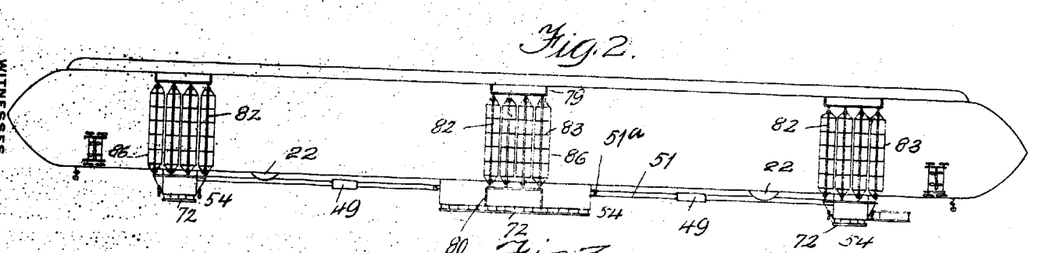
Fig. 2 is a diagrammatic side elevation of the airship.
Figures 12, 13, 14:
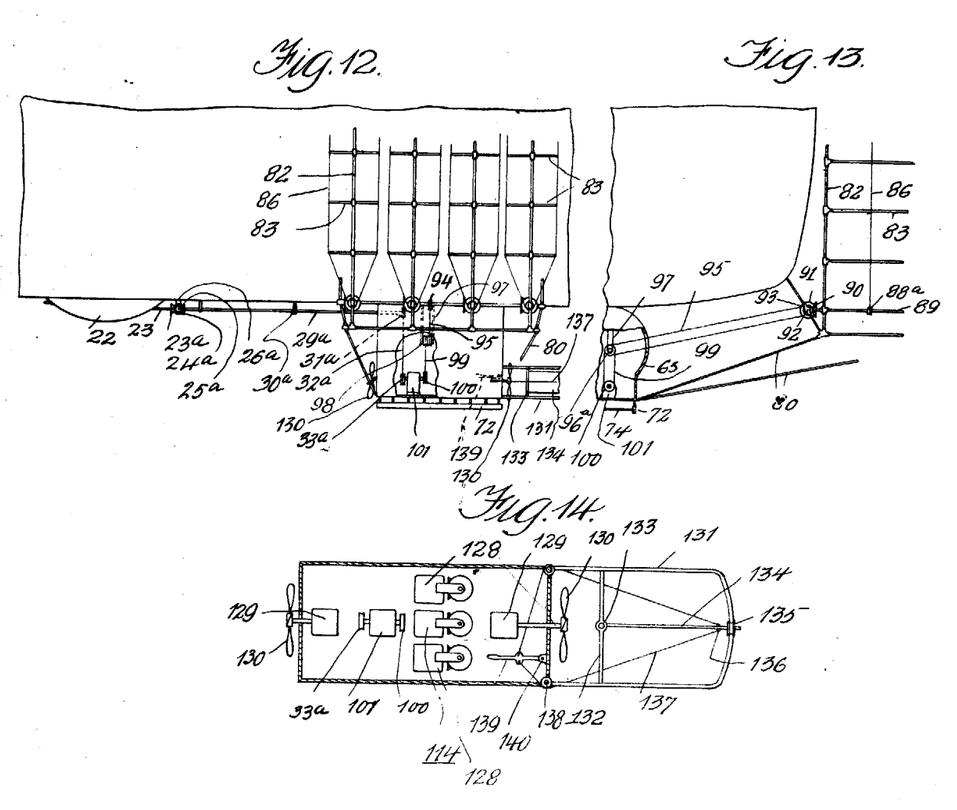
Fig. 12 is an enlarged elevation of a portion of the airship partly broken away and partly in section, showing the operating mechanism of the planes.
Fig. 13 is an end view of the same.
Fig. 14 is an enlarged horizontal sectional view of one of the operating compartments of the airship showing the rudder thereof.

*Propellers and the driving mechanism thereof.*—The airship at each side thereof and between the planes and the ends of the airship is provided with propellers adapted to assist in raising or lowering either end of the airship and in swinging either end to the right or to the left, as occasion may demand. Four sets of propellers are used and arranged in the manner above described, and as each set is identical in construction, I deem it only necessary to describe one of said sets and for this purpose reference will be had to Figs. 1, 10 and 11. Each set of propellers embodies a housing 102 supported by projecting frames 103 from the main frame of the airship. Each housing comprises platforms 104 and 105 and journaled in these platforms are vertical shafts 106 and 107, the shaft 107 being of a greater length than the shaft 106, whereby the lower end thereof will extend downwardly from the platform 105. The shafts 106 and 107 have the upper and lower ends thereof provided with horizontal propellers 108 employed for raising and lowering the ends of the airship, and the extreme end of the shaft 107 is provided with a belt wheel 109 for a belt 110 adapted to extend through an opening 111 provided therefor in the end of the operating compartment. The belt 110 passes over a belt wheel 112 mounted upon a vertical shaft 113 arranged in the operating compartment and adapted to be driven by a motor or other source of power 114. The motor 114 is employed for operating the horizontal propellers upon both sides of the airship at one end thereof, the belt wheel 112 being double to accommodate the belts 110 extending from each side of the airship. The shafts 106 and 107 are provided with horizontal belt wheels 115 for an endless belt 116 which permits of the shafts 106 and 107 being operated in unison. Arranged between the platforms 104 and 105 are vertical posts 117 and revolubly supported by said posts are horizontal shafts 118 having the outer ends thereof provided with propellers 119, while the inner ends are provided with beveled gear wheels 120 meshing with beveled gear wheels 121 mounted upon a vertical shaft 122 journaled in the platforms 104 and 105. The lower end of the shaft 122 is provided with a belt wheel 123 and over said belt wheel passes a belt 124 which passes through an opening 125 provided therefor in the end of the operating compartment. The belt 124 passes over a belt wheel 126 mounted upon a vertical shaft 127 adapted to be driven by a motor 128 located within the operating compartment. The propellers 119 are employed for moving the end of the airship either to the right or to the left, and a conventional form of switch or other means (not shown) can be employed for controlling the operation of the motors 114 and 128. In addition to the propellers just described, I provide each operating compartment with motors 129 for operating propellers 130, these propellers being employed for moving the airship back and forth. Besides using the propellers for assisting in the steering and guiding of the airship, I provide one or both of the operating compartments with rudders. Referring to Figs. 1 and 14 it will be observed that the operating compartment has the end thereof provided with horizontal super-imposed frames 131 connected by transverse braces 132 and pivotally mounted between said braces and intermediate the ends thereof by a pin 133 is the rear end rudder 134, the forward end of said rudder having the upper and lower ends thereof provided with guide wheels 135 adapted to engage the outer ends of the frames 131 and support the forward end of the rudder. Attached to the forward end of the rudder, as at 136 is an endless cable 137 extending over revoluble sheaves 138 into the operating compartment, where the cable is attached to a lever 139 and pivotally connected to a bracket 140, carried by the wall of the operating compartment. By simply shifting the lever 139 the rudder can be swung in a desired direction.

Figure 3:
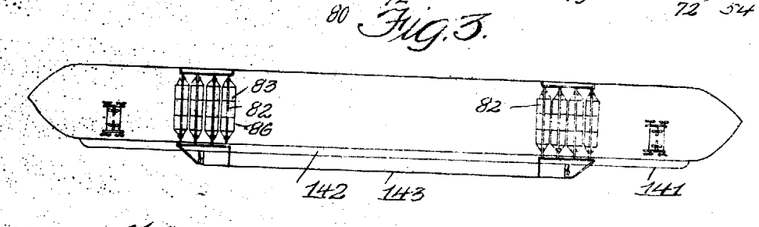
Fig. 3 is a similar view of an airship designed for war purposes.
Figure 4:
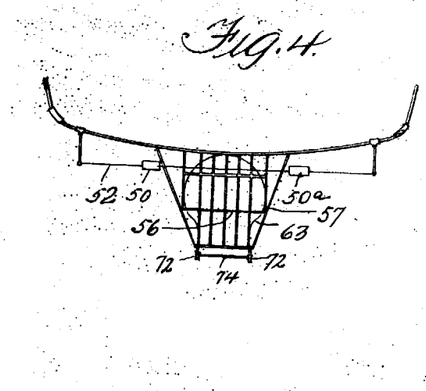
Fig. 4 is an enlarged end view of a portion of the airship frame, showing one of the compartments or carriages thereof.
Figure 5:
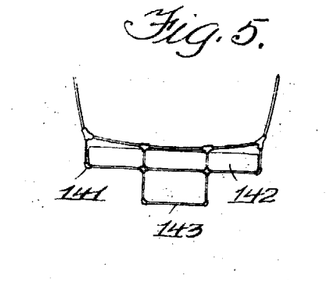
Fig. 5 is an enlarged end view of a portion of the frame of the airship shown in Fig. 3 of the drawings.

*An airship designed for war purposes.*—In Fig. 3 of the drawings, I have shown an airship constructed along the lines of the airship just described, with these exceptions. The intermediate planes are dispensed with and the airship made upon a smaller scale, with the main frame thereof provided with depending supports 141 for a plurality of alternately arranged air ballast bags or ballonnets 142, these bags being arranged so that air or gas can be exhausted from the bags to maintain the equilibrium of the airship and its elevation in the air when bombs, torpedoes or other explosives are dropped from the airship, thus preventing a sudden flight or elevation of the airship when bombs or other matter is thrown overboard. Instead of separate passenger compartments, the depending support 141 is provided with a central longitudinal frame 143 for a suitable compartment adapted to contain the officers and crew of the airship. It is in connection with this type of airship that war vessels and fortifications can be destroyed by dropping bombs or torpedoes holding powerful explosives, and arrangements can be made whereby the airship can be lowered and propelled at a great speed over the war ship or fortification, and simultaneously release a bomb or torpedo and sufficient air from the airship to compensate for the weight of the bomb or torpedo. This can be accomplished by either releasing air from the buoyancy bags or ballonnets 142 or in the case of emergency from some of the ballonnets of the main frame through the medium of a rip-cord or similar means. The aim in view in connection with this type of airship is simply to maintain the equilibrium of the same after bombs or torpedoes have been discharged.

From the foregoing it will be observed that by the novel arrangement of the planes, propellers, ballast tanks and balancing devices that the flight of the airship can be easily controlled. In some instances, the propellers 130 and the planes can coöperate in moving the airship forward, particularly when maneuvering in the face of a strong air current, and when traveling with the air current the planes can be solely relied upon for raising and lowering the airship. The propellers 119 together with the rudder will positively control the movement of the airship to the right or to the left, while the propellers 108 and the ballast tanks will control the ascent and descent of the airship. Through the medium of these various operating devices the airship can be maneuvered in any desired direction and turned around practically within its own length. The planes arranged at the sides of the airship assist materially in handling an airship of such great dimensions, besides reducing the amount of power ordinarily carried by a dirigible balloon for operating and controlling the balloon.

In the large type of airship where the operating compartments are separated, telephonic communications can be established whereby the airship can be commanded by one officer.

Having now described my invention what I claim as new, is:—

1. In an airship, a frame including a centrally disposed main rod, an upper and a lower intermediate main rod in alinement with the centrally disposed main rod, a pair of intermediate main side rods, corner rods in alinement with the side rods and intermediate the main rods, and bars connecting said rods together to provide an upper and a lower pair of rectangular compartments, and a longitudinally-extending ballonnet mounted in each of said compartments.

2. In an airship, a frame including a centrally disposed main rod, an upper and a lower intermediate main rod in alinement with the centrally disposed main rod, a pair of intermediate main side rods, corner rods in alinement with the side rods and intermediate the main rods, bars connecting said rods together to provide an upper and a lower pair of rectangular compartments, and a series of longitudinally-extending ballonnets mounted in each of said compartments.

3. In an airship, a frame including a centrally disposed main rod, an upper and a lower intermediate main rod in alinement with the centrally disposed main rod, a pair of intermediate main side rods, corner rods in alinement with the side rods and intermediate the main rods, bars connecting said rods together to provide an upper and a lower pair of rectangular compartments, a longitudinally-extending ballonnet mounted in each of said compartments, a roof mounted upon said frame and provided with a series of longitudinally-extending compartments increasing in size from each side of the roof to the center thereof, and ballonnets of varying sizes mounted in the compartments of the roof.

4. In an airship, a frame including a centrally disposed main rod, an upper and a lower intermediate main rod in alinement with the centrally disposed main rod, a pair of intermediate main side rods, corner rods in alinement with the side rods and intermediate the main rods, bars connecting said rods together to provide an upper and a lower pair of rectangular compartments, a series of longitudinally-extending ballonnets mounted in each of said compartments, a roof mounted upon said frame and provided with a series of longitudinally-extending compartments increasing in size from each side of the roof to the center thereof, and ballonnets of varying sizes mounted in the compartments of the roof.

5. In an airship, a frame provided with longitudinally-extending superposed compartments, a series of longitudinally-extending ballonnets mounted in each of said compartments, a roof mounted upon said frame and provided with a series of longitudinally-extending compartments increasing in size from each side of the roof to the center thereof, and longitudinally-extending ballonnets of varying sizes mounted in the compartments of the roof.

6. In an airship, a frame provided with longitudinally-extending superposed compartments, a series of longitudinally-extending ballonnets mounted in each of said compartments, a nose at one end of said frame, trusses at the sides of the frame, a roof mounted upon said frame and provided with a series of longitudinally-extending compartments increasing in size from each side of the roof to the center thereof, and longitudinally-extending ballonnets of varying sizes mounted in the compartments of the roof.

7. In an airship, a frame provided with longitudinally-extending superposed compartments, a series of longitudinally-extending ballonnets mounted in each of said compartments, a roof mounted upon said frame and provided with a series of longitudinally-extending compartments increasing in size from each side of the roof to the center thereof, longitudinally-extending ballonnets of varying sizes mounted in the compartments of the roof, said ballonnets within the compartments of the frame being rectangular in cross-section and said ballonnets within the compartments of the roof being cylindrical in cross-section.

8. In an airship, a frame provided with longitudinally-extending superposed compartments, a series of longitudinally-extending ballonnets mounted in each of said compartments, a roof mounted upon said frame and provided with a series of longitudinally-extending compartments increasing in size from each side of the roof to the center thereof, longitudinally-extending ballonnets of varying sizes mounted in the compartments of the roof, said ballonnets within the compartments of the frame being rectangular in cross-section and said ballonnets within the compartments of the roof being cylindrical in cross-section, and cables for maintaining the ballonnets in the compartments of said frame.

In testimony whereof I affix my signature in the presence of two witnesses.

HANS VON DER OELSNITZ.

Witnesses:
    HERMAN ECKHARDT,
    J. G. KAISER.